United States Patent
Kumfer et al.

(10) Patent No.: US 8,981,954 B2
(45) Date of Patent: Mar. 17, 2015

(54) METHODS, SYSTEMS, AND APPARATUS FOR PROTECTION SYSTEM ACTIVATION AND DYNAMIC LABELING

(75) Inventors: Brent Charles Kumfer, Farmington, CT (US); Robert Joseph Caggiano, Wolcott, CT (US); Michael Anthony Leporace, Bridgeville, PA (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 13/466,248

(22) Filed: May 8, 2012

(65) Prior Publication Data
US 2013/0300566 A1 Nov. 14, 2013

(51) Int. Cl.
*G08B 21/00* (2006.01)
*H01H 73/00* (2006.01)

(52) U.S. Cl.
USPC ............. 340/686.6; 361/42; 361/62; 361/115

(58) Field of Classification Search
CPC .... H01H 2071/006; H02H 3/006; H02H 9/00
See application file for complete search history.

(56) References Cited

U.S. PATENT DOCUMENTS

| | | | | |
|---|---|---|---|---|
| 4,797,568 | A | * | 1/1989 | Gumbs ......................... 307/141 |
| RE39,081 | E | * | 5/2006 | Thomas ........................ 340/578 |
| 7,254,001 | B2 | * | 8/2007 | Papallo et al. .................. 361/64 |
| 7,292,422 | B2 | | 11/2007 | Culligan et al. |
| 2007/0121265 | A1 | | 5/2007 | Hill et al. |
| 2007/0133844 | A1 | * | 6/2007 | Waehner et al. ............... 382/118 |
| 2008/0142486 | A1 | | 6/2008 | Vicente et al. |
| 2009/0174261 | A1 | * | 7/2009 | Kuo ................................. 307/80 |
| 2010/0072355 | A1 | | 3/2010 | Schweitzer, III et al. |
| 2010/0133922 | A1 | | 6/2010 | Payack |
| 2011/0172840 | A1 | * | 7/2011 | Narel et al. .................... 700/292 |

FOREIGN PATENT DOCUMENTS

WO 2008003088 A2 1/2008

OTHER PUBLICATIONS

Parsons, et al.; Simplified Arc-Flash Hazard Analysis Using Energy Boundary Curves; IEEE Transactions on Industry Applications; dated Nov./Dec. 2008, pp. 1879-1885, vol. 44, No. 6.
GE Energy Industrial Solutions; Arc Vault Protection System Installation, Operation, Maintenance; dated 2010; pp. 50.

(Continued)

*Primary Examiner* — Benjamin C Lee
*Assistant Examiner* — Rajsheed Black-Childress
(74) *Attorney, Agent, or Firm* — General Electric Company (57) ABSTRACT

Methods, devices, and systems for activation of a protection system and dynamic labeling are described. An example system for use with a plurality of circuit protection devices coupled to a switchgear unit includes a first sensor for detecting a body located within a first zone associated with a threshold distance from the switchgear unit, and a controller coupled to the first sensor. The controller is configured to selectively enable the plurality of circuit protection devices. The controller is configured to enable a first circuit protection device of the plurality of circuit protection devices in response to detecting, via the first sensor, a body within the first zone.

15 Claims, 5 Drawing Sheets

(56) References Cited

OTHER PUBLICATIONS

GE Energy Industrial Solutions; Arc Vault Arc Flash Protection System; dated 2010; pp. 8.

Lang et al., Impact of Arc Flash Events With Outward Convective Flows on Worker Protection Strategies; IEEE Transactions on Industry Applications; dated Jul./Aug. 2011; pp. 1597-1604, vol. 47, No. 4.

* cited by examiner

METHODS, SYSTEMS, AND APPARATUS FOR PROTECTION SYSTEM ACTIVATION AND DYNAMIC LABELING

BACKGROUND OF THE INVENTION

The embodiments described herein relate generally to protection systems and, more particularly, to methods, systems, and apparatus for enabling one or more protection systems and providing dynamic labeling.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables arc formation.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. In addition, an arc flash can release significant energy in the form of heat, intense light, pressure waves, and/or sound waves, sufficient to damage the conductors and adjacent equipment. Moreover, the released energy can cause significant injuries to humans in the vicinity of an arc fault event.

Although devices for detecting and mitigating arc fault events exist and agencies and standards exist to regulate arc flash issues by mandating the use of personal protective clothing and equipment, human error may still permit exposure to potentially hazardous arc fault conditions. In particular, some known systems for mitigating arc fault issues require a human operator to engage the system. Because the arc fault mitigating system is often co-located in an enclosure with the gear that it is protecting, an operator must approach the enclosure in order to turn on the arc fault mitigation protection gear. Moreover, personal protective clothing only protects an operator if the operator is wearing the clothing. Accordingly, the operator needs to know when protective clothing should be worn.

BRIEF DESCRIPTION OF THE INVENTION

In one aspect, a protection system for use with a plurality of circuit protection devices coupled to a switchgear unit includes a first sensor for detecting a body located within a first zone associated with a threshold distance from the switchgear unit, and a controller coupled to the first sensor. The controller is configured to selectively enable the plurality of circuit protection devices. The controller is configured to enable a first circuit protection device of the plurality of circuit protection devices in response to detecting, via the first sensor, a body within the zone.

In another aspect, a protection system includes a first sensor for detecting a body in a first zone associated with a first threshold distance from a switchgear unit, a second sensor for detecting a body in a second zone associated with a second threshold distance from the switchgear unit, a display device, and a controller coupled to the first sensor, the second sensor, and the display device. The controller is configured to cause the display device to display first information in response to detecting a body in the first zones and to display second information in response to detecting a body in the second zone.

In another aspect, a method includes determining a level of danger to a body based at least in part on a location of the body relative to a switchgear unit, and displaying information to the body based at least in part on the detected level of danger.

DETAILED DESCRIPTION OF THE INVENTION

Exemplary embodiments of a method, device, and system for protection system activation and dynamic labeling are described herein. These embodiments facilitate improving protection of persons from dangers arising from electrical equipment. The exemplary embodiments detect the proximity of a person to electrical equipment, such as switchgear, and automatically enable one or more protection devices as a function of the detected proximity of the person to the gear. Thus, protection devices are automatically enabled without a person needing to remember to enable the protection device. Moreover, in systems including more than one level of protection device, such as a system including a circuit breaker, an arc flash containment system, and a reduced energy let through (RELT) system, the level of protection can be varied as a function of the level of danger to the person as determined by the proximity of the person to the electrical equipment. Moreover, the exemplary embodiments provide dynamic labeling operable to display warning information to a person as a function of the level of danger to a person, determined, for example, by the proximity of the person to the electrical equipment. Thus, a person can be apprised of the level of danger to which the person is currently exposed, protective measures that should, or must, be taken, the status of protection devices, and/or rules/requirements/regulations applicable to the current level of danger to the person.

Figure 1:
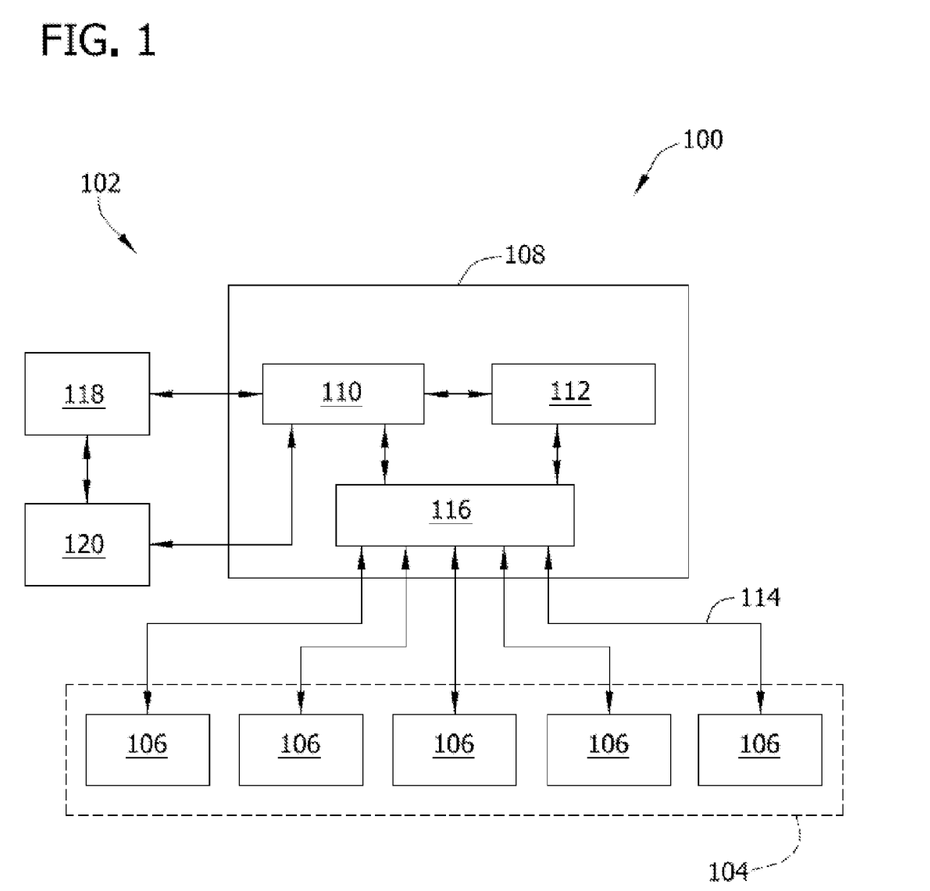
FIG. 1 is a schematic block diagram of an exemplary power system.

FIG. 1 is a schematic block diagram of an exemplary power system 100 that includes an equipment protection system 102 and a distribution system 104. In an exemplary embodiment, distribution system 104 includes a plurality of switchgear units 106. Protection system 102 includes a central controller 108 that includes a processor 110 and a memory 112 coupled to processor 110. Processor 110 controls and/or monitors operation of switchgear units 106. More specifically, processor 110 controls and/or monitors operation of a plurality of circuit breakers and trip units (neither shown in FIG. 1) within switchgear units 106. Processor 110 communicates with switchgear units 106 through a network 114. For example, central controller 108 includes a central communication unit 116 that enables transmitting and receiving data and/or commands between processor 110 and switchgear units 106 through network 114.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 112 stores program code and instructions, executable by processor 110, to control and/or monitor switchgear units 106. Memory 112 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 112. Memory 112 may also be, or include, a detachable or removable memory, including, but not limited to, a suitable cartridge, disk, CD ROM, DVD or USB memory.

In an exemplary embodiment, protection system 102 includes a display device 118 and a user input device 120 that provide a user interface for monitoring and controlling distribution system 104 using protection system 102. Display device 118 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, display device 118 includes a touch-screen with an associated touch-screen controller. Display device 118 may be of any suitable configuration, such as a square, a rectangle or an elongated rectangle. User input device 120 includes, without limitation, a keyboard, a keypad, a touch-sensitive screen, a mouse, a scroll wheel, a pointing device, an audio input device employing speech-recognition software, and/or any suitable device that enables a user to input data into power distribution system 104.

Figure 2:
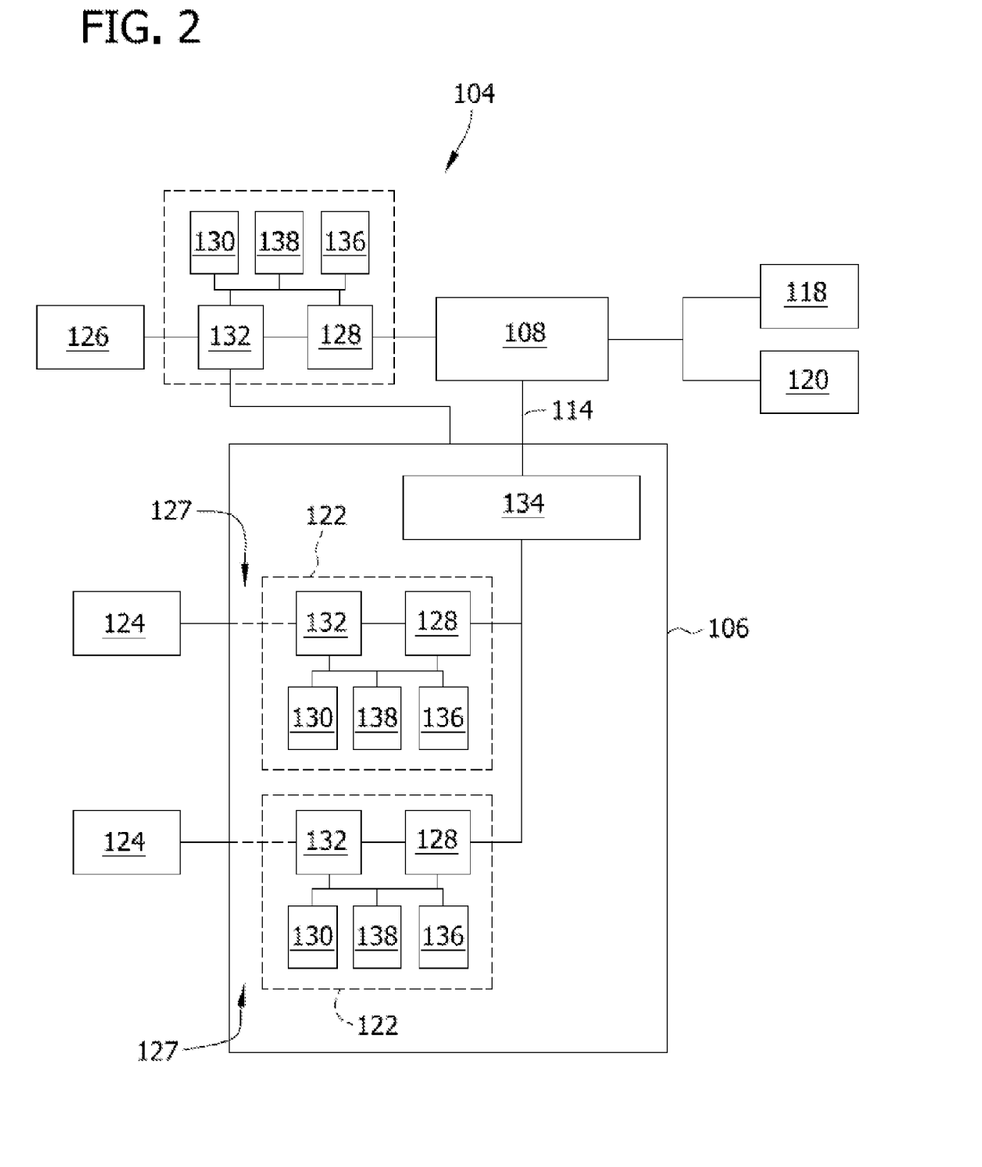
FIG. 2 is a schematic block diagram of an exemplary power distribution system that may be used with the power system shown in FIG. 1.

FIG. 2 is a schematic block diagram of power distribution system 104 including a plurality of circuit protection devices 122. Each circuit protection device 122 is removably coupled within switchgear unit 106 and is configured to control power to one or more loads 124. In an exemplary embodiment, circuit protection device 122 is an electronic trip unit (ETU) 122.

Loads 124 may include, but are not limited to only including, machinery, motors, lighting, and/or other electrical and mechanical equipment of a manufacturing or power generation or distribution facility. Power is provided to switchgear unit 106 from a main power feed 126, which is also coupled to circuit protection device 122. The power is then divided into a plurality of branch circuits 127 using circuit protection devices 122 for providing power to loads 124.

Each circuit protection device 122 includes a processor 128, as well as at least one sensor 130 and at least one trip mechanism 132, such as one or more circuit breakers or arc containment devices coupled to processor 128. Exemplary circuit breakers include, for example, circuit switches and/or circuit interrupters that interrupt current flow through the circuit breaker to a load coupled to the circuit breaker. An exemplary arc containment device includes, for example, a containment assembly, a plurality of electrodes, a plasma gun, and a trigger circuit that causes the plasma gun to emit ablative plasma into a gap between the electrodes to divert energy into the containment assembly from an arc or other electrical fault that is detected on the circuit.

Sensor 130 measures at least one operating condition of trip mechanism 132 and/or of circuit protection device 122. In an exemplary embodiment, sensor 130 is a temperature sensor 130 that measures a temperature of trip mechanism 132 and/or circuit protection device 122, or of ambient air in close proximity to trip mechanism 132 and/or circuit protection device 122. Alternatively, sensor 130 is a humidity sensor 130 that measures a humidity or moisture content of ambient air surrounding, or in close proximity to, trip mechanism 132 and/or circuit protection device 122 and/or a current sensor, such as a current transformer, a Rogowski coil, a Hall-effect sensor, and/or a shunt that measures a current flowing through trip mechanism 132 and/or circuit protection device 122. In some embodiments, sensor 130 is a voltage sensor 130. Still alternatively, sensor 130 may include a combination of temperature, humidity, voltage, and/or current sensors and/or any other type of sensor that enables power distribution system 104 to function as described herein. In an exemplary embodiment, each sensor 130 generates data representative of the measured temperature (hereinafter referred to as "temperature data") and/or data representative of the measured humidity (hereinafter referred to as "humidity data") at, or in close proximity to, an associated trip mechanism 132. In addition, each sensor 130 transmits a signal including, or representing, the temperature data and/or the humidity data to a processor 128 associated with, or coupled to, trip mechanism 132. Each processor 128 is programmed to activate trip mechanism 132 to interrupt a current provided to a load 124 if the temperature data, humidity data, and/or any other operating condition data exceeds a programmable trip threshold.

In an exemplary embodiment, processors 128 are also communicatively coupled to central controller 108. For example, processors 128 may be directly coupled for communication with central controller 108, or may be coupled for communication with central controller 108 through a communication unit 134. Communication between processors 128 and central controller 108 may also be provided through a hardwired communication link or through a wireless communication link. Processors 128 collect measured operating condition data relating to a corresponding trip mechanism 132. For example, each processor 128 gathers measured operating condition data, such as measured temperature and/or humidity data, from a sensor 130 associated with a trip mechanism 132 coupled to processor 128. In some embodiments, processor 128 periodically receives the measured operating condition data at a preselected frequency. For example, processor 128 receives temperature and/or humidity data at a frequency of about every minute, every hour, every day, or any other frequency. Processor 128 stores values representative of the temperature and/or humidity data in a memory 136 coupled to processor 128, and/or transmits the temperature and/or humidity data to central controller 108. In an alternative embodiment, circuit protection devices 122 do not include processors 128, and the functionality of processors 128 is incorporated into central controller 108.

Memory 136 stores program code and instructions, executable by processor 128, to control and/or monitor circuit protection device 122 and/or trip mechanism 132. In an exemplary embodiment, memory 136 includes non-volatile RAM to enable data stored in memory 136 to be retained after a power loss. Alternatively or additionally, memory 136 may include magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 136. Memory 136 may also be, or include, a detachable or removable memory, including, but not limited to, a suitable cartridge, disk, CD ROM, DVD or USB memory.

Circuit protection device 122 also includes a display device 138 coupled to processor 128. In an exemplary embodiment, display device 138 includes one or more light-emitting diodes (LEDs) that indicate a status of circuit protection device 122. For example, processor 128 may activate one or more components (e.g., LEDs) of display device 138 to indicate that current protection device 122 and/or trip mechanism 132 is active and/or operating normally, that a fault or failure has occurred, that a useful life of trip mechanism 132 or another component of circuit protection device 122 is below a threshold, and/or any other status of trip mechanism 132 and/or circuit protection device 122.

While circuit protection device 122 has been described in FIG. 2 with reference to switchgear units 106 of power distribution system 104, it should be recognized that circuit protection device 122, or any components thereof, may be used with any device or system. Additionally or alternatively, sensor 130 and processor 128 may monitor or measure operating conditions, such as temperature and/or humidity, at, or in close proximity to, any other device or system other than trip mechanism 132.

Figure 3:
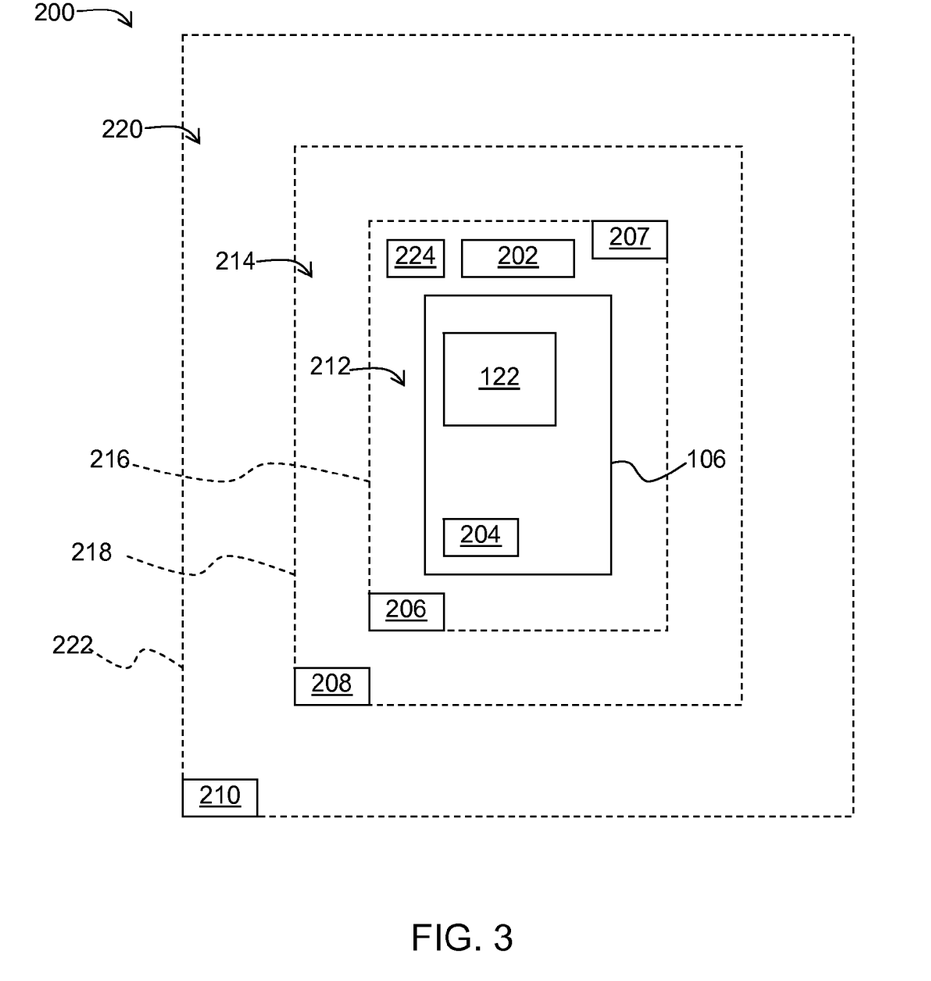
FIG. 3 is a schematic block diagram of an exemplary protection system that may be used with the power system shown in FIG. 1.

FIG. 3 is a schematic block diagram of a protection system 200 for use with power system 100. Protection system 200 includes circuit protection device 122, a controller 202, and a plurality of sensors 204-210. Although a single circuit protection device 122 is illustrated in FIG. 3, circuit protection system 200 may include any number of circuit protection devices 122.

Sensors 204-210 generally directly or inferentially detect a level of danger from switchgear unit 106 to which a person, or body, may be exposed. The dangers to which the person may be exposed include, for example, electrical shock, fire hazard, pressure waves, excessive sound levels, etc. The level of danger to a person, also referred to herein as a danger level, is generally directly related to the proximity of the person to the source of the danger, e.g. switchgear unit 106. Sensors 204-210 may detect the level of danger by detecting the proximity of a person, or body, (not shown) to circuit protection device 122 and switchgear unit 106 and/or by detecting a status of circuit protection device 122 and/or switchgear unit 106. For example, sensor 204 detects whether a housing door (not shown) of switchgear unit 106 is open or closed. A person may be exposed to greater danger from switchgear unit 106 if the housing door is open than if the door were closed. In particular, some circuit protection devices, such as some arc containment devices, may not operate effectively if a housing door is open. Sensors 206 and 208, which may be referred to as a first sensor 206 and a second sensor 208, detect whether a person is located within a first zone 212 or a second zone 214. First zone 212 is associated with a first threshold 216 and second zone 214 is associated with a second threshold 218. First threshold 216 is a first threshold distance from switchgear unit 106, while second threshold 218 is a second threshold distance from switchgear unit 106. In the exemplary embodiment, sensors 206 and 208 detect when a person crosses first threshold 216 and second threshold 218, respectively, in order to determine that a person has entered first zone 212 and/or second zone 214. In other embodiments, sensors 206 and 208 may be motion detectors or proximity sensors configured to detect the presence of a person within first zone 212 and second zone 214. Similarly, sensor 210 is configured to detect whether a person has entered a third zone 220. In the exemplary embodiment, sensor 210 is coupled to a door of a room housing switchgear unit 106 and configured to detect when a person enters the room and third zone 220. Sensor 210 may be, for example, a laser sensor detecting when a person crosses a threshold 222 to enter the room and third zone 220. In other embodiments, sensor 210 may be a door sensor configured to detect when the door to the room housing switchgear unit 106 is opened. Although four sensors 204-210 are described in the exemplary embodiment, protection system 200 may include more or fewer sensors and correspondingly more or fewer zones and/or thresholds. Moreover, protection system 200 may include a single type of sensor, or multiple types of sensors. Sensors 204-210 may be any type of sensor suitable for detecting the proximity of a person to circuit protection device 122 and switchgear unit 106. For example, sensors 204-210 may include motion sensors, laser sensors, door sensors, proximity sensors, etc.

Zones 212, 214, and 220, associated with and/or defined in relation to sensors 204-210, generally indicate increasing levels of danger to which a person may be exposed. Outside the room in which switchgear unit 106 is located, a person is farthest from switchgear unit 106 and, accordingly, exposed to the least danger from switchgear unit 106. In third zone 220, a person is located closer to switchgear unit 106 than when outside the room, but still relatively far away from switchgear unit 106. In the second zone 214, the person is closer to switchgear unit 106 and, thus, the potential danger level for the person is increased over the third zone. Within first zone 212, the person is closest to switchgear unit 106 and is exposed to the greatest potential danger levels. More specifically, thresholds 216, 218, and 222 and zones 212, 214, and 220 are defined in some embodiments in accordance with one or more safety agency codes, regulations, and/or standards. In one embodiment, thresholds and zones are defined in accordance with approach boundaries as defined by the National Fire Prevention Association. In one example embodiment, first zone 212 is a prohibited zone in which a person must use the same personal protective equipment that would be used if direct contact with live wires were planned, second zone 214 is a restricted approach zone in which only qualified personnel are permitted with appropriate protection, and third zone 220 is a limited approach zone in which unqualified personnel may only enter with a qualified supervisor or escort. In other embodiments, zones 212, 214, and 220 may be other types of zones with other limitations and definitions. In some embodiments, one or more of zones 212, 214, and 220 may additionally or alternatively be defined by the type of danger or injury that may be experienced in each zone. For example, in some embodiments, zones 212 and 214 may be zones in which a person is likely to experience second degree or greater burns upon occurrence of an arc flash in switchgear unit 106.

Controller 202 is communicatively coupled to sensors 204-210. In an exemplary embodiment, controller 202 is also communicatively coupled to central controller 108 and processors 128. Communication between controller 202, processors 128, and central controller 108 may be provided through a hardwired communication link or through a wireless communication link. Controller 202 monitors sensors 204-210 to determine a proximity of a person to switchgear unit 106 and/or a level of danger to which the person may be exposed.

Moreover, controller 202 is configured to selectively enable circuit protection device 122. In the exemplary embodiment, controller 202 is a digital controller including a processor and a memory device (neither shown). The memory device contains instructions that, when executed by the processor, cause the processor, and thereby controller 202, to perform as described herein. In other embodiments, controller 202 is an analog controller. In the exemplary embodiments, controller 202 is separate from other controllers, such as central controller 108. In other embodiments, central controller 108 and/or processors 128 may perform the functions assigned to controller 202.

Figure 4:
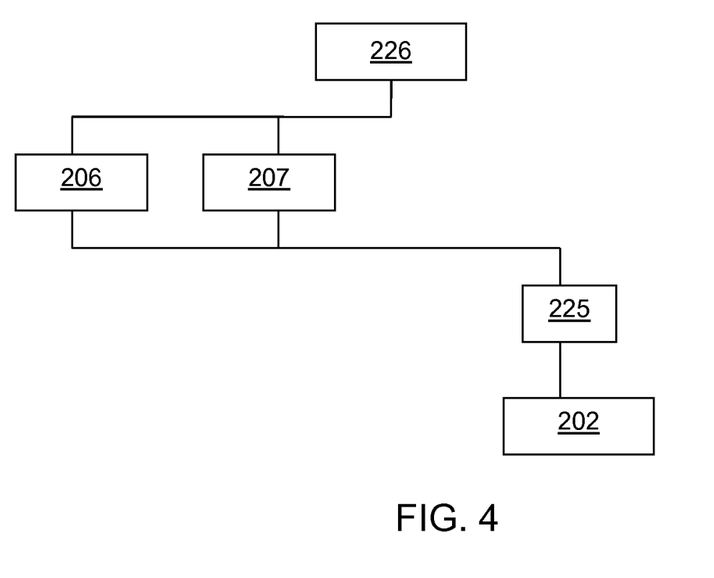
FIG. 4 is a schematic block diagram showing a parallel connection of two sensors of the exemplary protection system shown in FIG. 3.
Figure 5:
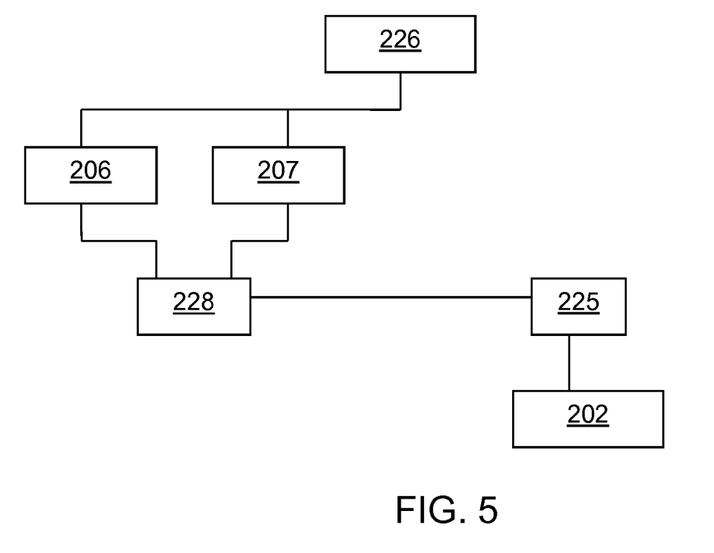
FIG. 5 is a schematic block diagram showing another parallel connection of two sensors of the exemplary protection system shown in FIG. 3.

Sensors 204-210 may be communicatively coupled to controller 202 independent of one another (e.g., each connected to a separate input of controller 202, coupled to controller 202 via a multiplexer, etc.), or may be coupled to controller 202 in parallel. FIGS. 4 and 5 are schematic block diagrams showing parallel connection of sensors 206 and 207 to controller 202. An interposing relay 225 is coupled between sensors 206 and 207 and controller 202 to reduce noise sensitivity and to allow for paralleled inputs. In the exemplary embodiment, sensors 208 and 210 are coupled to controller independent of each other and independent of sensors 206 and 207. In the embodiments of both of FIGS. 4 and 5, sensors 206 and 207 are coupled to controller 202 in parallel via interposing relay 225. Electrical power for operation of sensors 206 and 207 is provided by a power source 226. Sensors 206 and 207 are both associated with zone 212 and are configured to detect a body in zone 212. The signals from sensors 206 and 207 may be used by controller 202 in any suitable manner as described herein. Moreover, by using two sensors for a single zone, accuracy may be improved by decreasing false detections and/or the robustness and reliability of the system may be increased. For example, in FIG. 5, signals from sensors 206 and 207 are subjected to an "AND" operation by AND gate 228, requiring both sensors 206 and 207 to detect a body in zone 212 before controller 202 will determine that a body is present in zone 212 and perform as described herein. Thus, nuisance activations, i.e. false alarms, may be reduced. In the embodiment of FIG. 4, sensors 206 and 207 are subjected to an "OR" operation. In this embodiment, controller 202 determines a body is present in zone 212 if either sensor 206 or sensor 207 detects a body in zone 212. This configuration may continue to provide protection for a person even if one of the parallel connected sensors 206 and 207 were to fail or malfunction. Sensors 206 and 207 may additionally or alternatively be coupled to interposing relay 225 via an OR gate in a configuration similar to that shown in FIG. 5 (in which AND gate 228 would be an OR gate). In other embodiments, two or more of sensors 204-210 may be connected separately to controller 202, whether via interposing relays or not, and controller may, via appropriate programming, subject the received signals to logical operations as described above. Although described above with reference to only two sensors, any suitable number of sensors may be connected to controller 202 in parallel. Moreover, parallel connected sensors may be used in different ways and or in different combinations. For example, signals from sensors 206 and 207 may be combined in a logical AND operation when sensor 204 indicates the door of switchgear unit 106 is closed and combined with an OR operation if sensor 204 indicates the door of switchgear unit 106 is open.

With reference again to FIG. 3, controller 202 is configured, such as via instructions stored in a memory device, to control circuit protection device 122 based at least in part on input from sensors 204-210. In particular, controller 202 enables and/or increases the protection provided by circuit protection device 122 as a person gets closer to switchgear unit 106. In some embodiments, controller 202 is configured to disable and/or decrease the protection provided by circuit protection device 122 as the distance between a person and switchgear unit 106 increases. In still other embodiments, protection provided by circuit protection device 122 may be, additionally or alternatively, disabled and/or decreased manually by a person. Moreover, in some such embodiments, controller 202 is configured to prohibit a person from manually disabling and/or decreasing the protection when a body is detected in one or more of zones 212, 214, and 220. As used herein, "enabling" protection or "enabling" a circuit protection device refers to energizing, turning-on, and/or activating a de-energized, turned-off, and/or inactive circuit protection device. For example, when sensors 204-210 do not detect any person within zones 212, 214, and 220, controller 202 may maintain circuit protection device 122 in an off state or in a minimal protection state. As a person crosses thresholds 222, 218, and 216, thereby entering zones 220, 214, and 212, respectively, the level of protection provided by protection device 122 is increased by controller 202. The increased protection may be accomplished by enabling, or switching on, one or more protection device (e.g., an arc containment device) that is currently switched off, and/or enabling reduced energy let through (RELT) protection. Moreover, "enabling" a circuit protection device includes enabling a different protection level of a circuit protection device. Thus, the increased protection may be accomplished by decreasing the trip threshold in a circuit breaker (i.e., enabling a different protection scheme or threshold in the circuit breaker). Accordingly, as a person enters zones in which the person is potentially exposed to more danger, the level of protection for the person is automatically and progressively increased. As used herein, "enabling" a circuit protection device generally does not include activating the actual protection provided by the circuit protection device. For example, controller 202 may enable an arc containment device by turning the device on, at which time the arc containment device monitors and prepares to protect against an electrical arc. Except in device testing situations, the arc containment device does not engage its protection until and unless the arc containment device detects an electrical arc.

Controller 202 provides a dynamic information display to a person via display device 224, which is communicatively coupled to controller 202. Display device 224 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. Controller 202 is configured to cause display device 224 to display information related to the state of protection device 122 and/or the potential level of danger to which the person may currently be exposed. Accordingly, when there are no persons within zones 212, 214, or 220, controller 202 may cause display device 224 to indicate that protection is currently disabled. As a person enters zones 220, 214, and 212, controller updates the display on display device 224 to indicate the level of protection enabled (e.g., arc containment device enabled, circuit breaker thresholds decreased, RELT engaged, etc.). Moreover, in the exemplary embodiment controller 202 causes warning, hazard, and/or instructional information to be displayed on display device 224. The information displayed on the display device is based at least in part on the location of a body relative to switchgear unit 106. Thus, controller 202 causes display device 224 to display first information in response to detecting a body in a first zone, such as zone 214, and to display second information in response to detecting a body in a second zone, such as zone 212. For example, in some embodiments, controller 202 presents, via display device 224, supervision, certification, and/or protective gear information on display device 224 as a function of the location of a body. Thus, the required level of supervision/certification required may be displayed when a body is detected in zone 214. When a body is detected in zone 212, in which protective equipment is required, controller 202 causes display device 224 to display a warning to the person that protective clothing is required.

In some embodiments, protection system 200 includes one or more devices for presenting information to a person in addition to, or alternative to, display device 224. For example, system 200 may include a loudspeaker. Controller may provide audible status and warnings to a person similar to those displayed on display device 224. The audible status and/or warnings may include detailed information, such as a verbal reproduction of the text displayed on display device 224, or may include non-verbal sounds, such as alarm sounds, to indicate that a danger level has increased and/or to draw the person's attention to the display device 224. The additional devices may include other visual indicators, such as flashing lights.

Figure 6:
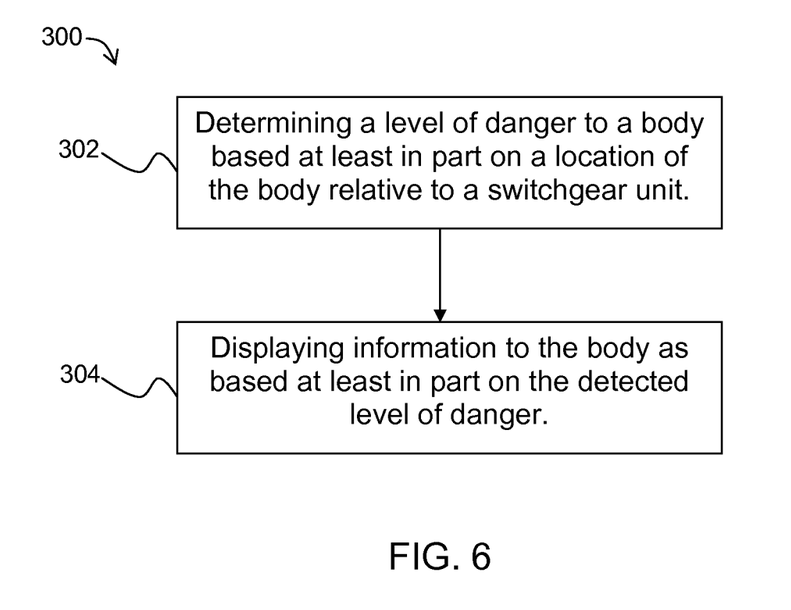
FIG. 6 is a flow diagram of an exemplary method for use with a protection system.

FIG. 6 is a flowchart of an exemplary method 300 for use with a protection system, such as protection system 200. Method 300 includes determining 302 a level of danger to a body based at least in part on a location of the body relative to a switchgear unit. The location of the body is detected via at least one sensor. A controller causes a display device to display 304 warning information to the body based at least in part on the detected level of danger. Method 300 is at least partially executed by a processor. For example, a plurality of computer-executable instructions are embodied within a computer-readable medium. The instructions, when executed by the processor, cause the processor to execute the steps of method 300 and/or to function as described herein.

Figure 7:
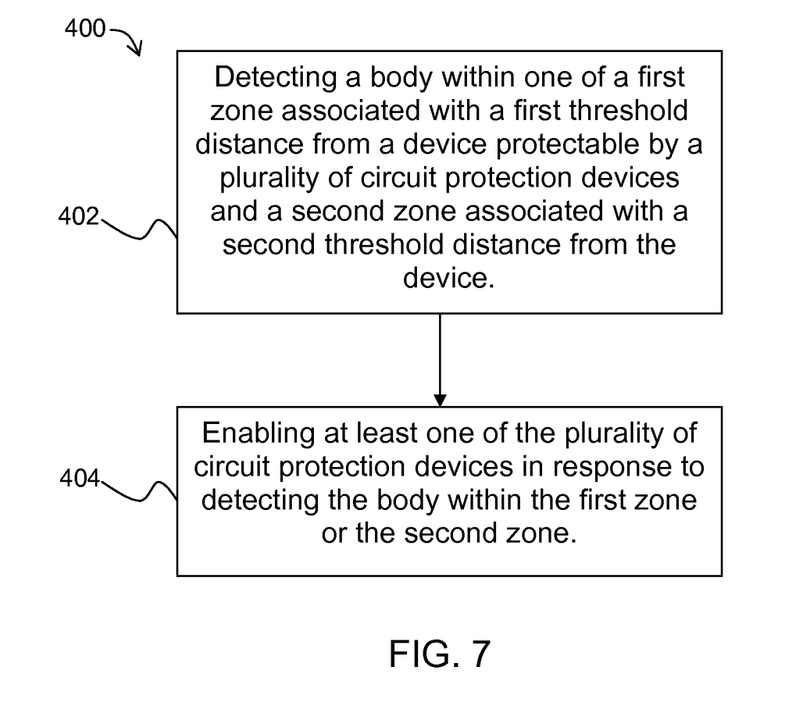
FIG. 7 is a flow diagram of another exemplary method for use with a protection system.

FIG. 7 is a flowchart of an exemplary method 400 for use with a protection system, such as protection system 200. Method 400 includes detecting 402 a body within one of a first zone associated with a first threshold distance from a device protectable by a plurality of circuit protection devices and a second zone associated with a second threshold distance from the device. The detection of the body within the first zone or the second zone is detected via at least one sensor. A controller enables 404 at least one of the plurality of circuit protection devices in response to detecting the body within the first zone or the second zone. Method 400 is at least partially executed by a processor. For example, a plurality of computer-executable instructions are embodied within a computer-readable medium. The instructions, when executed by the processor, cause the processor to execute the steps of method 400 and/or to function as described herein.

A technical effect of the method, device, and system described herein may include one or more of: (a) determining a level of danger to a body based at least in part on a location of the body relative to a switchgear unit; and (b) displaying warning information to the body based at least in part on the detected level of danger.

Exemplary embodiments of a method, device, and system protection system activation and dynamic labeling are described above in detail. The method, device, and system are not limited to the specific embodiments described herein but, rather, operations of the method and/or components of the system and/or device may be utilized independently and separately from other operations and/or components described herein. Further, the described operations and/or components may also be defined in, or used in combination with, other systems, methods, and/or devices, and are not limited to practice with only the system, method, and device as described herein.

Although the present invention is described in connection with an exemplary circuit protection system, embodiments of the invention are operational with numerous other circuit protection systems, or other systems or devices. The circuit protection system described herein is not intended to suggest any limitation as to the scope of use or functionality of any aspect of the invention. In addition, the circuit protection system described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A protection system for use with a plurality of circuit protection devices coupled to a switchgear unit, said protection system comprising:
   a first sensor for detecting a body located within a first zone associated with a threshold distance from the switchgear unit;
   a second sensor for detecting a body within a second zone associated with a second threshold distance from the switchgear unit;
   a display device positioned to be visible to bodies in the first zone and the second zone; and
   a controller coupled to said first sensor, said second sensor and the display device, said controller configured to:
   selectively enable the plurality of circuit protection devices, said controller configured to enable a first circuit protection device of the plurality of circuit protection devices in response to detecting, via said first sensor, a body within the first zone, and said controller configured to enable a second circuit protection device of the plurality of circuit protection devices in response to detecting, via a second sensor, a body within the second zone; and cause said display device to display a first information in response to detecting a body in the first zone and to display a second information in response to detecting a body in the second zone.

2. A protection system in accordance with claim 1, wherein said first sensor is a door sensor configured to detect when a door to the switchgear unit is opened.

3. A protection system in accordance with claim 1, wherein said first sensor is a door sensor configured to detect when a door to a room in which the switchgear unit is located is opened.

4. A protection system in accordance with claim 1, wherein said first sensor is a motion sensor configured to detect motion of a body within the first zone.

5. A protection system in accordance with claim 1, wherein said first sensor is a laser sensor configured to detect when a body crosses the threshold distance from the switchgear unit.

6. A protection system in accordance with claim 1, further comprising an interposing relay, wherein said first sensor and said second sensor are coupled to said controller via said interposing relay.

7. A protection system in accordance with claim 6, wherein said first sensor and said second sensor are coupled in parallel to said interposing relay.

8. A protection system in accordance with claim 6, further comprising a logic gate, wherein said first sensor and said second sensor are coupled to said logic gate and said logic gate is coupled to said interposing relay.

9. A protection system in accordance with claim 1, wherein said first sensor is configured to detect a location of the body relative to the switchgear unit and the first information is based at least in part on the distance of the body from the switchgear unit.

10. A protection system in accordance with claim 1, wherein the first sensor is configured to detect whether a door is in a first position or a second position and the first information is based at least in part on whether the door is in the first position or the second position.

11. A protection system in accordance with claim 1, wherein said controller is further configured to cause said display device to display a third information based at least in part on a status of the circuit protection devices.

12. A method comprising:
determining a level of danger to a body based at least in part on a location of the body relative to a switchgear unit, wherein determining a level of danger to a body comprises determining in which one of a plurality of zones relative to the switchgear unit the body is located;

enabling a first circuit protection device to protect the switchgear unit in response to detecting the body within a first zone, enabling a second circuit protection device to protect the switchgear unit in response to detecting the body within a second zone, and displaying information visible to the body at the location based at least in part on the detected level of danger, wherein displaying warning information comprises displaying information relevant to the one of the plurality of zones in which the body is located.

13. A method in accordance with claim 12, wherein determining a level of danger to a body comprises detecting the location of the body relative to the switchgear unit utilizing at least one sensor.

14. A method in accordance with claim 12, wherein determining a level of danger to a body comprises determining in which one of a plurality of zones relative to the switchgear unit the body is located, and wherein enabling a circuit protection device comprises enabling a different one of a plurality of types of protection devices of the circuit protection device based on the one of the plurality of zones in which the body is located.

15. A method comprising:
detecting a body within one of a first zone associated with a first threshold distance from a device protectable by a plurality of circuit protection devices and a second zone associated with a second threshold distance from the device;

enabling a first circuit protection device of the plurality of circuit protection devices in response to detecting a body within the first zone, enabling a second circuit protection device of the plurality of circuit protection devices in response to detecting a body within the second zone, and causing a display device, positioned to be visible to bodies in the first zone and the second zone, to display a first information in response to detecting a body in the first zone and to display a second information in response to detecting a body in the second zone.

* * * * *